(12) United States Patent
Huang

(10) Patent No.: US 9,989,210 B1
(45) Date of Patent: Jun. 5, 2018

(54) MODULARIZED HEADLIGHT

(71) Applicant: Yujing Technology Co., Ltd., New Taipei (TW)

(72) Inventor: Cheng Feng Huang, New Taipei (TW)

(73) Assignee: Yujing Technology Co., Ltd., New Taipei (TW)

( * ) Notice: Subject to any disclaimer, the term of this patent is extended or adjusted under 35 U.S.C. 154(b) by 0 days. days.

(21) Appl. No.: 15/585,657

(22) Filed: May 3, 2017

(30) Foreign Application Priority Data

Mar. 14, 2017 (CN) ...................... 2017 2 0247094 U

(51) Int. Cl.
*B60Q 1/00* (2006.01)
*B60Q 3/00* (2017.01)
*B60Q 11/00* (2006.01)
*F21V 5/00* (2018.01)
*F21S 8/10* (2006.01)
*F21Y 115/10* (2016.01)

(52) U.S. Cl.
CPC ........... *F21S 48/328* (2013.01); *F21S 48/115* (2013.01); *F21S 48/1208* (2013.01); *F21S 48/1317* (2013.01); *F21S 48/321* (2013.01); *F21Y 2115/10* (2016.08)

(58) Field of Classification Search
CPC .... F21S 48/328; F21S 48/321; F21S 48/1317; F21S 48/1208; F21S 48/115; F21Y 2115/10
See application file for complete search history.

(56) References Cited

U.S. PATENT DOCUMENTS

2012/0294024 A1* 11/2012 Peck ...................... B60Q 1/06
362/516

* cited by examiner

*Primary Examiner* — Donald Raleigh
(74) *Attorney, Agent, or Firm* — C. G. Mersereau; Nikolai & Mersereau, P.A.

(57) ABSTRACT

A modularized headlight has a heat sink base, a lens assembly on a front end of the heat sink base, a first illuminating module and a first reflector on a first stage of the heat sink base, a second illuminating module and a second reflector on a second stage of the heat sink base, and a shading component on the first stage. When the first illuminating module is emitting light, the light beams are reflected by the first reflector toward the lens assembly through the shading component to provide a low beam mode. When the second illuminating module is emitting light, the light beams are reflected by the second reflector toward the lens assembly to provide a high beam mode. The modularized headlight is switched between the two modes without mechanical mechanism so that components of the modularized headlight may not be worn out and durability is improved.

18 Claims, 11 Drawing Sheets

MODULARIZED HEADLIGHT

CROSS-REFERENCE TO RELATED APPLICATIONS

This application is based upon and claims priority under 35 U.S.C. 119 from China Patent Application No. 201720247094.1 filed on Mar. 14, 2017, which is hereby specifically incorporated herein by this reference thereto.

BACKGROUND OF THE INVENTION

1. Field of the Invention

The present invention relates to a modularized headlight, especially to a modularized headlight that can provide both high beams and low beams.

2. Description of the Prior Arts

With the advance of automotive industry, how to provide a safe, stable, and sturdy headlight for illumination becomes an important field in the automotive industry.

According to FIGS. 10 and 11, a conventional headlight comprises an installing base 91, a reflector 92, an illuminating module 93, a shading component 94 and a lens 95. The installing base 91 has a protrusion 911 and a sliding groove 912 on a front side of the installing base 91. A turning component 913 is disposed under the protrusion 911. The reflector 92 is mounted on a rear side of the installing base 91 and the reflector 92 has a reflecting surface 921 formed on an inner surface of the reflector 92. The illuminating module 93 is mounted at a center of the reflector 92. The shading component 94 has a sleeve portion 941 on a right side of the shading component 94. The sleeve portion 941 is sleeved on the protrusion 911 and thereby the shading component 94 is rotatable with respect to the front side of the installing base 91. A left side of the shading component 94 is mounted in the sliding groove 912. The shading component 94 further has an extending portion 942, and the extending portion 942 is formed at a bottom end of the right side of the shading component 94. The extending portion 942 extends downward and is mounted in the turning component 913. The lens 95 is mounted at a front end of the installing base 91.

When the headlight provides a high beam mode, a signal is transmitted to the turning component 913, which makes the turning component 913 drive the extending portion 942 to move rightward. Meanwhile, the left side of the shading component 94 moves downward in a radial direction along the sliding groove 912 and thereby the shading component 94 may not shade a lower edge of the illuminating module 93. Therefore, light beams generated by the illuminating module 93 may be reflected by the reflecting surface 921 of the reflector 92, and most of the light beams pass through a middle portion and an upper portion of the lens 95. In other words, the light beams can be concentrated and can illuminate a far area. On the contrary, when the headlight provides a low beam mode, another signal is transmitted to the turning component 913, which makes the turning component 913 drive the extending portion 942 to move back. Meanwhile, the shading component 94 shades the lower edge of the illuminating module 93, which makes the reflecting surface 921 of the reflector 92 reflect the light beams emitted by the illuminating module 93, so that most of the light beams are transmitted form a middle and a lower part of the lens 95 and thereby the headlight provides divergent light beams and illuminates a near but large area.

Consequently, the conventional headlight is switched by a mechanical mechanism, which makes the shading component 94 shade or not shade the lower edge of the illuminating module 93 for controlling courses of the light beams and thereby provides the high beam mode or the low beam mode. However, the mechanism is prone to wear out when switching. The higher a frequency of switching is, the faster the mechanism wears out, which may make the headlight broken and not working, such that an accident happens. Thus, a durability of the conventional headlight should be improved.

To overcome the shortcomings, the present invention provides a headlight to mitigate or obviate the aforementioned problems.

SUMMARY OF THE INVENTION

The main objective of the present invention is to provide a modularized headlight that can provides a high beam mode and a low beam mode.

The modularized headlight has:
a lens assembly comprising:
an optical axis;
a heat sink base, a front end of the heat sink base connected to the lens assembly and comprising:
a first stage formed on the front end of the heat sink base; and
a second stage formed on a rear end of the heat sink base;
a first illuminating module mounted on the first stage and under the optical axis;
a first reflector mounted on the first stage and comprising:
a first reflecting surface facing the first illuminating module;
a second illuminating module mounted on the second stage and under the optical axis;
a second reflector mounted on the second stage and comprising:
a second reflecting surface facing the second illuminating module; and
a shading component mounted on the heat sink base at a front side of the first illuminating module.

Other objectives, advantages and novel features of the invention will become more apparent from the following detailed description when taken in conjunction with the accompanying drawings.

DETAILED DESCRIPTION OF THE
PREFERRED EMBODIMENTS

Figure 1:
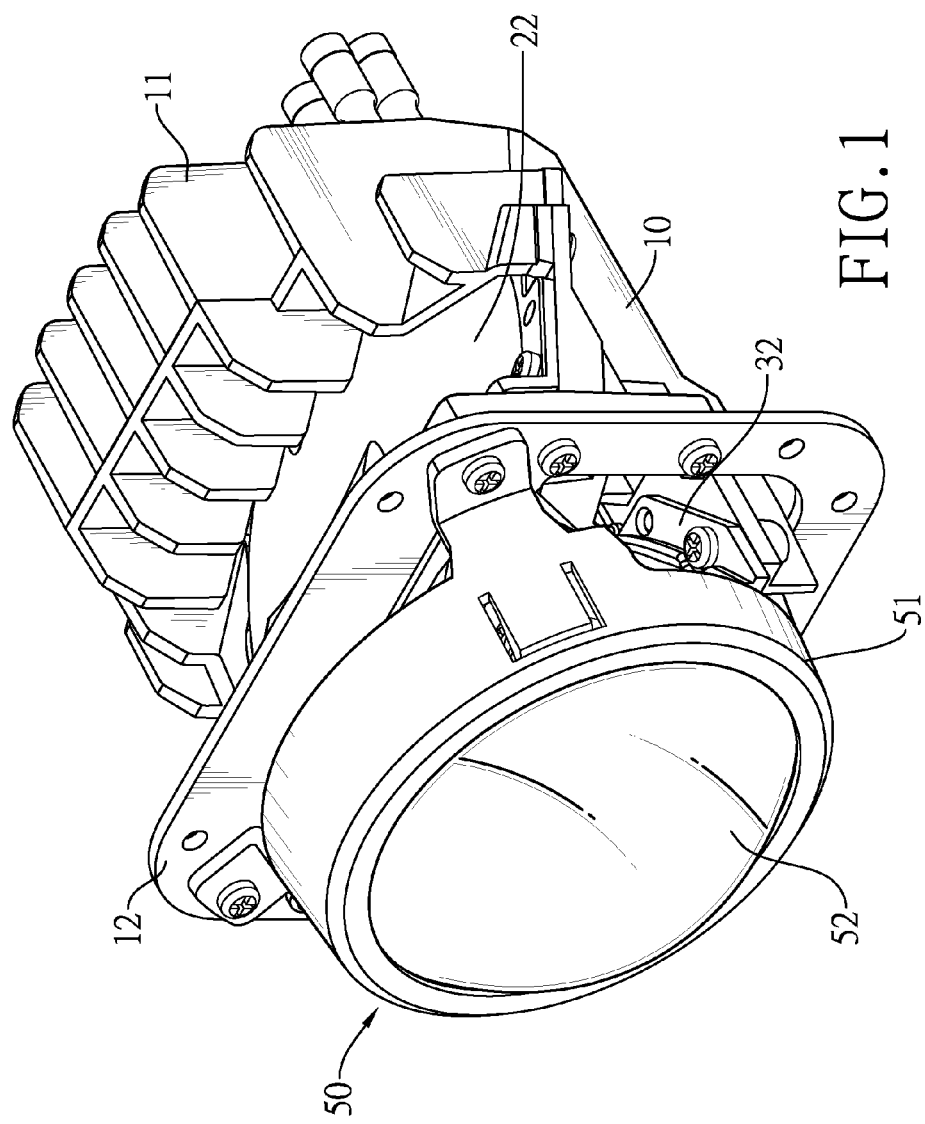
FIG. 1 is a perspective view of a modularized headlight in accordance with the present invention.
Figure 2:
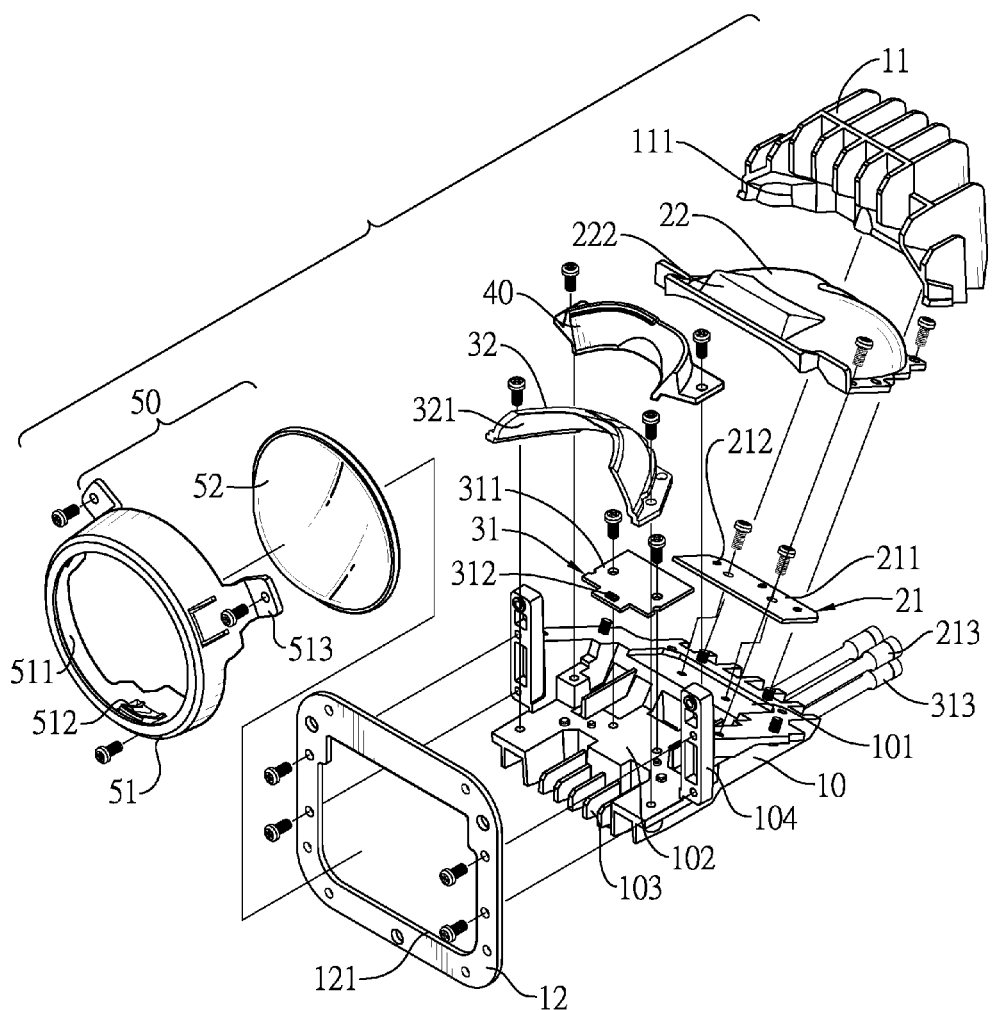
FIG. 2 is an exploded view of the modularized headlight in FIG. 1.

With reference to FIGS. 1 and 2, a modularized headlight in accordance with the present invention comprises a heat sink base 10, a first illuminating module 21, a first reflector 22, a second illuminating module 31, a second reflector 32, a shading component 40, and a lens assembly 50. In this embodiment, the heat sink base 10 comprises a heat sink component 11 and a fixing frame 12.

Figure 3:
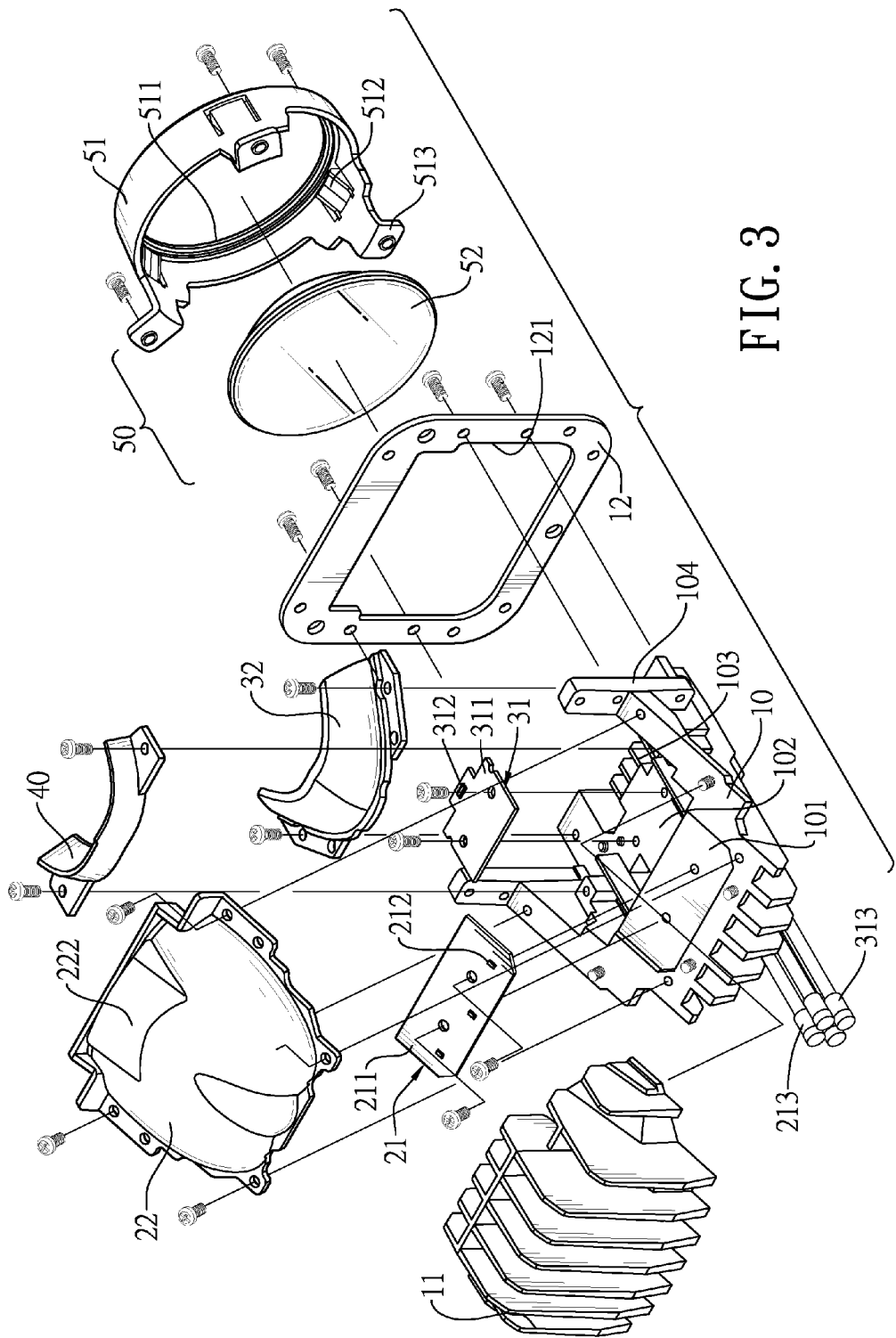
FIG. 3 is another exploded view of the modularized headlight in FIG. 1.

Then please refer to FIGS. 2 and 3, which show a structure of the heat sink base 10. The heat sink base 10 includes a front end and a rear end opposite each other, and a first side and a second side opposite each other. The first side is a right portion of the heat sink base 10, and the second side is a left portion of the heat sink base 10. The heat sink base 10 comprises a first stage 101, a second stage 102, and a heat sink portion 103. The first stage 101 is formed at the rear end of the heat sink base 10. The second stage 102 is formed at the front end of the heat sink base 10. In accordance with FIG. 8, the first stage 101 is inclined upward at an angle θ. The heat sink portion 103 is formed on the front end of the heat sink base 10.

In this preferred embodiment, the second stage 102 is formed under and in front of the first stage 101. In other words, the second stage 102 is below the first stage 101.

The heat sink component 11 is mounted on the first stage 101. A front end of the heat sink component 11 is concaved inward and forms a cavity 111 for accommodating the first illuminating module 21 and the first reflector 22. In this preferred embodiment, the heat sink component 11 comprises multiple heat sink fins, and the heat sink component 11 is made of aluminum for providing better heat sink capability.

The second stage 102 comprises two first connecting portions 104. The two first connecting portions 104 are mounted respectively on a left edge and a right edge of the second stage 102 and near the front end of the heat sink base 10. The fixing frame 12 is mounted on the first connecting portions 104. In other words, the fixing frame 12 is disposed at the front end of the heat sink base 10. In this embodiment, the fixing frame 12 is fixed on the first connecting portions 104 by screws.

The fixing frame 12 comprises a first opening 121 on a center of the fixing frame 12. The front end of the heat sink base 10 extends frontward, through and out of the first opening 121 and thereby the heat sink portion 103 of the heat sink base 10 is disposed at a front surface of the fixing frame 12.

The first illuminating module 21 is mounted on the first stage 101 and comprises a first substrate 211 and three first LEDs (Light Emitting Diode) 212. In this preferred embodiment, the first substrate 211 is fixed on the first stage 101 by multiple screws. The first substrate 211 includes a first portion and a second portion opposite each other. The first portion of the first substrate 211 is a left side of the first substrate 211 and the second portion of the first substrate 211 is a right side of the first substrate, such that the first portion and the second portion of the first substrate 211 are corresponding to the first side and the second side of the heat sink base 10. The first LEDs 212 are mounted on the first portion, the second portion, and a middle portion of the first substrate 211 respectively so that the first LEDs 212 are spaced apart from each other.

In this preferred embodiment, the first substrate 211 further comprises a first cable 213 connected to a power controlling circuit (not illustrated in the drawings) of a vehicle, and thereby the first LEDs 212 can be controlled to emit or not by controlling the vehicle.

In this preferred embodiment, each one of the first LEDs 212 is a low power LED (3 watts, for example). In comparison with one high power LED that generates heat at one point such that the heat is hard to disperse, heat generated by multiple low power LEDs can be dissipated more easily.

Figure 4:
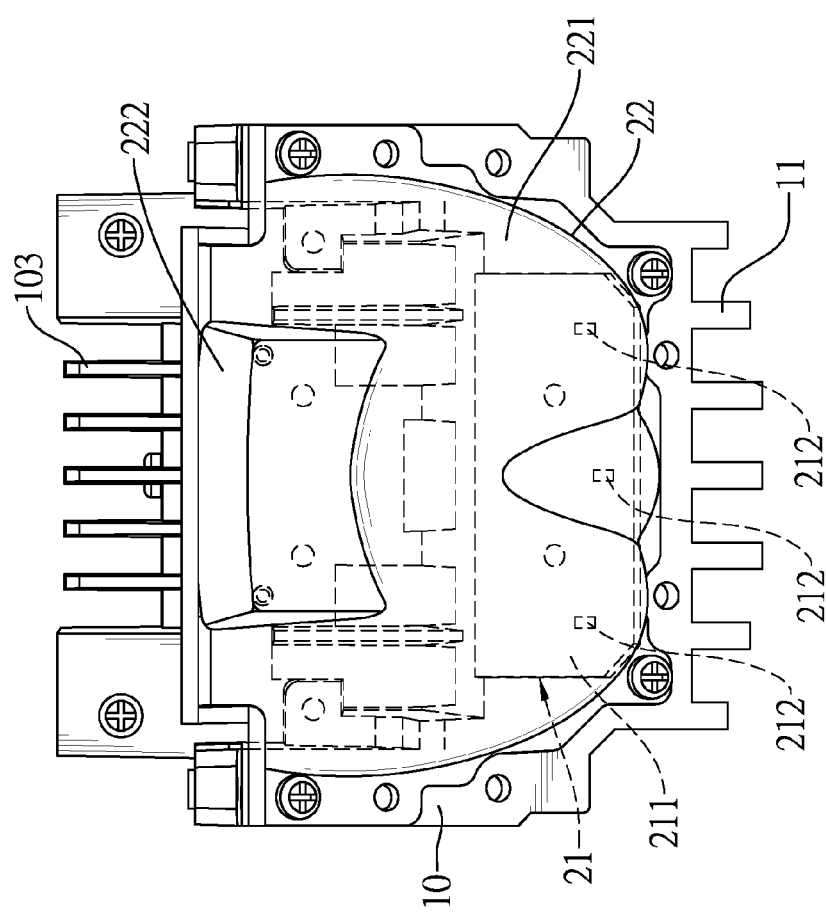
FIG. 4 is a top view of a first illuminating module and a first reflector of the modularized headlight in FIG. 1.

The first reflector 22 is mounted on the first stage 101 and in the cavity 111 of the heat sink component 11, and the first reflector 22 covers the first illuminating module 21. In this preferred embodiment, the first reflector 22 is fixed on the heat sink base 10 by a plurality of screws. Then please refer to FIGS. 4 and 7, which illustrate a relation between the first reflector 22 and the first illuminating module 21. An inner surface of the first reflector 22 forms a first reflecting surface 221. The first reflecting surface 221 comprises a left side reflecting surface area, a middle reflecting surface area, and a right side reflecting surface area, which respectively face the three first LEDs 212 mounted on the first portion, the middle portion, and the second portion of the first substrate 211, and thereby light beams generated by the first LEDs 212 are reflected.

In this preferred embodiment, with the first stage 101 inclined upward by the angle θ, an emitting surface of each one of the first LEDs 212 faces the first reflecting surface 221 of the first reflector 22.

A front end of the first reflector 22 forms a reflecting portion 222. An inner surface of the reflecting portion 222 forms a first reflective surface 223 such that the upward and forward light beams generated by the first LEDs 212 are reflected by the first reflective surface 223.

The second illuminating module 31 is mounted on the second stage 102 and comprises a second substrate 311 and a second LED 312. In this preferred embodiment, the second substrate 311 is fixed on the heat sink base 10 by a plurality of screws.

In this preferred embodiment, the second substrate 311 comprises a second cable 313 connected to the power controlling circuit of the vehicle, and thereby the second LED 312 can be controlled by the vehicle.

The second reflector 32 is mounted on the second stage 102 for covering the second illuminating module 31. In this preferred embodiment, the second reflector 32 is fixed on the heat sink base 10 by a plurality of screws.

Figure 7:
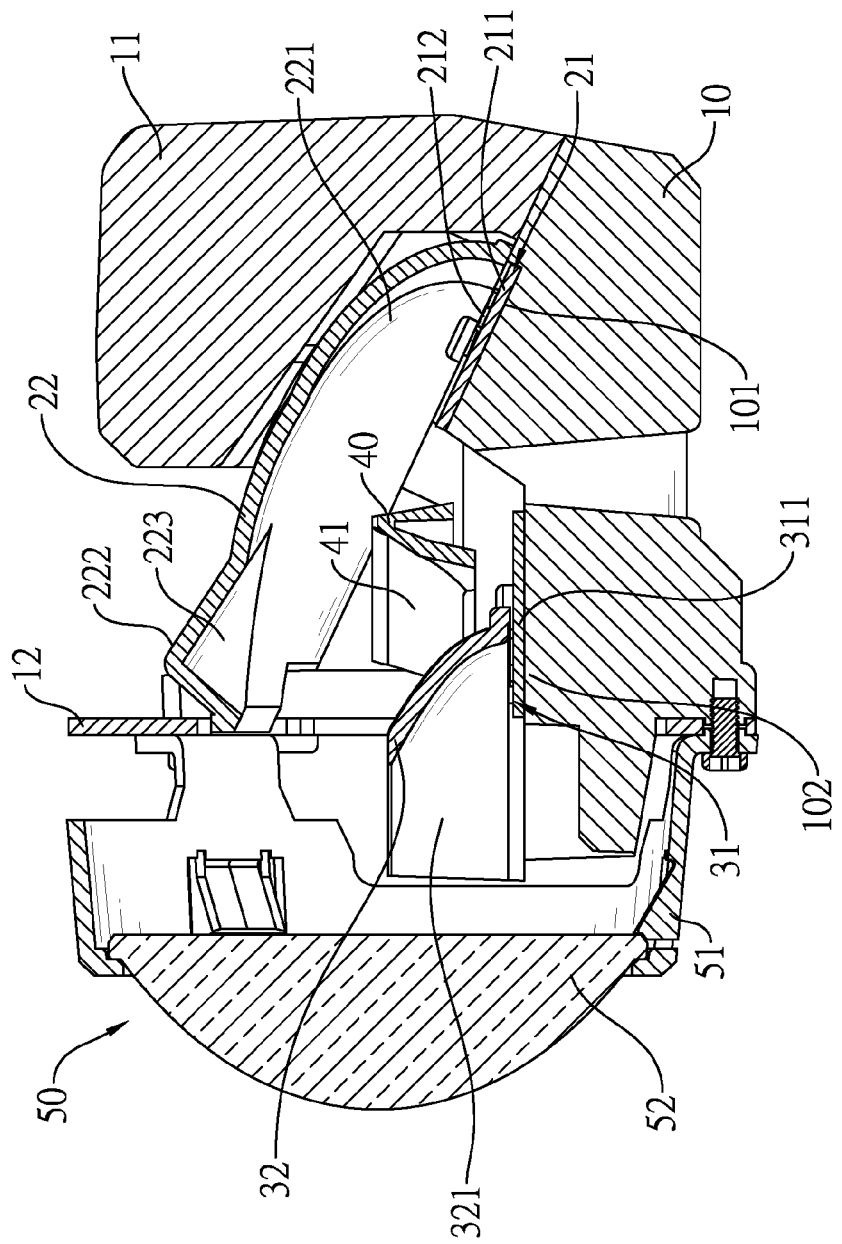
FIG. 7 is a sectional view of the modularized headlight in FIG. 1.

Then refer to FIGS. 2 and 7, which illustrate a relation between the second reflector 32 and the second illuminating module 31. An inner surface of the second reflector 32 forms a second reflecting surface 321. The second reflecting surface 321 faces an emitting surface of the second LED 312 of the second illuminating module 31 and thereby reflects light beams generated by the second LED 312.

The shading component 40 is mounted on the heat sink base 10. As shown in FIGS. 2 and 3, in this preferred embodiment, the shading component 40 is fixed on the heat sink base 10 by a plurality of screws and is mounted between the first illuminating module 21 and the second reflector 32.

Figure 5:
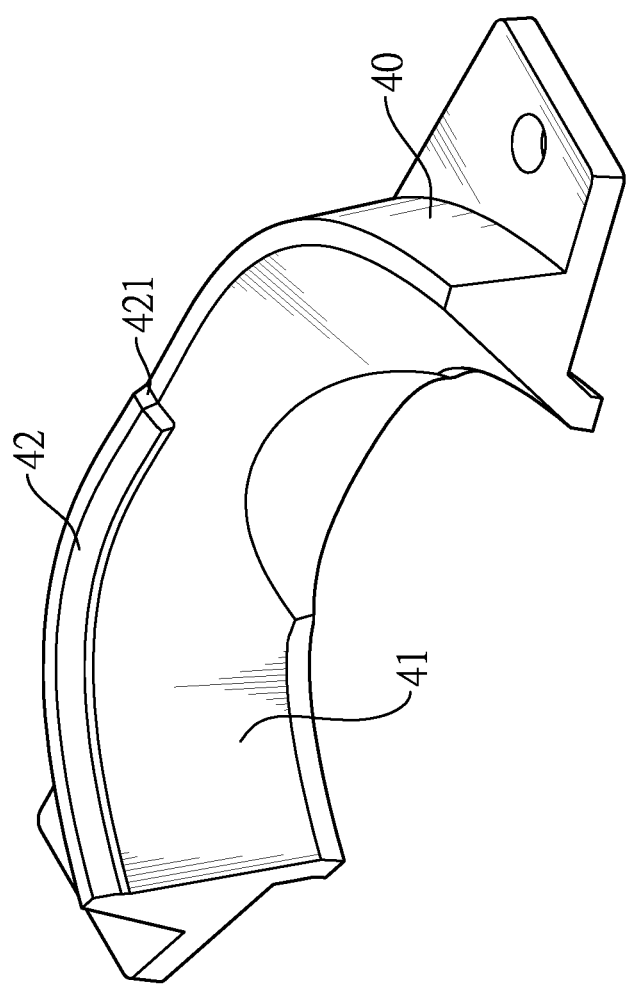
FIG. 5 is a perspective view of a shading component of the modularized headlight in FIG. 1.
Figure 6:
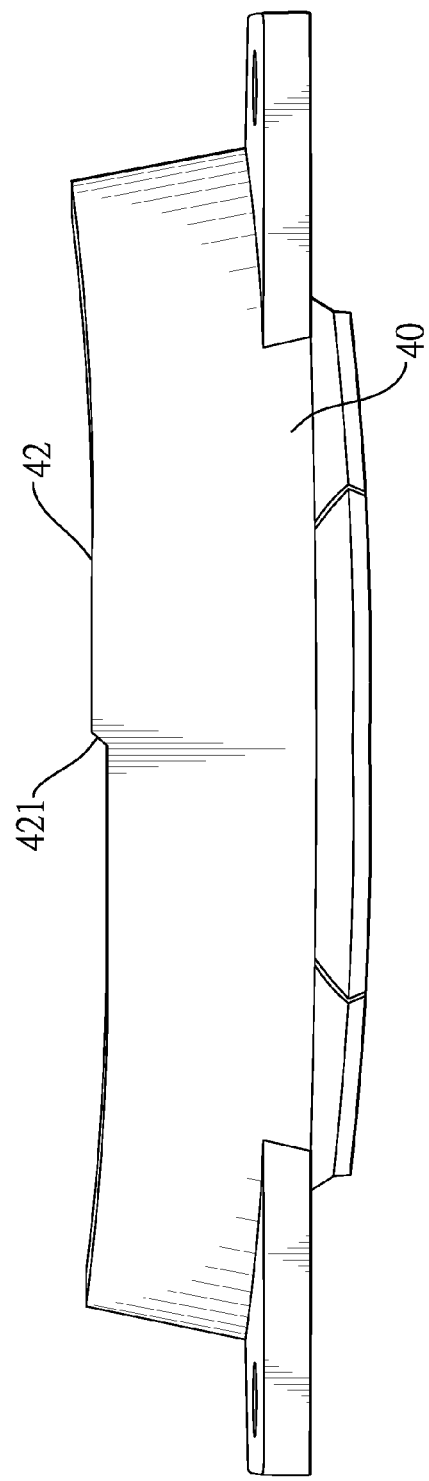
FIG. 6 is a rear view of the shading component of the modularized headlight in FIG. 1.

Then please refer to FIGS. 5 and 6, which show a structure of the shading component 40. The shading component 40 is arcuate and has a first end and a second end opposite each other. The first end is a left end of the shading component 40 and the second end is a right end of the shading component 40, and thereby the first end and the second end correspond to the first side and the second side of the heat sink base 10. A front side surface of the shading component 40 forms a second reflective surface 41. In this preferred embodiment, the second reflective surface 41 is an inclined surface. A left part of a top portion of the shading component 40 forms a shade portion 42 extending upward. The shade portion 42 comprises a slope 421 formed on a right end of the shade portion 42.

In this preferred embodiment, as shown in FIG. 7, the second reflective surface 41 corresponds in location to the first reflecting portion 223 of the first reflector 22.

The lens assembly 50 is mounted on the front end of the heat sink base 10. As shown in FIGS. 2 and 3, the lens assembly 50 comprises a lens frame 51 and a lens 52.

The lens frame 51 comprises a second opening 511, a plurality of engaging portions 512, and a plurality of second connecting portions 513. The second opening 511 is formed in a middle of the lens frame 51 for accommodating the lens 52. The engaging portions 512 are formed on an inner surface of the lens frame 51 and are spaced apart from each other for engaging an edge of the lens 52. Thus, the lens 52 is fixed on the lens frame 51. The second connecting portions 513 are formed on an outer surface of the lens frame 51, and the second connecting portions 513 extend rearward. With the second connecting portions 513 mounted on the fixing frame 12, the lens frame 51 is fixed on the front surface of the fixing frame 12. In this preferred embodiment, the second connecting portions 513 are fixed on the fixing frame 12 by multiple screws.

Figure 8:
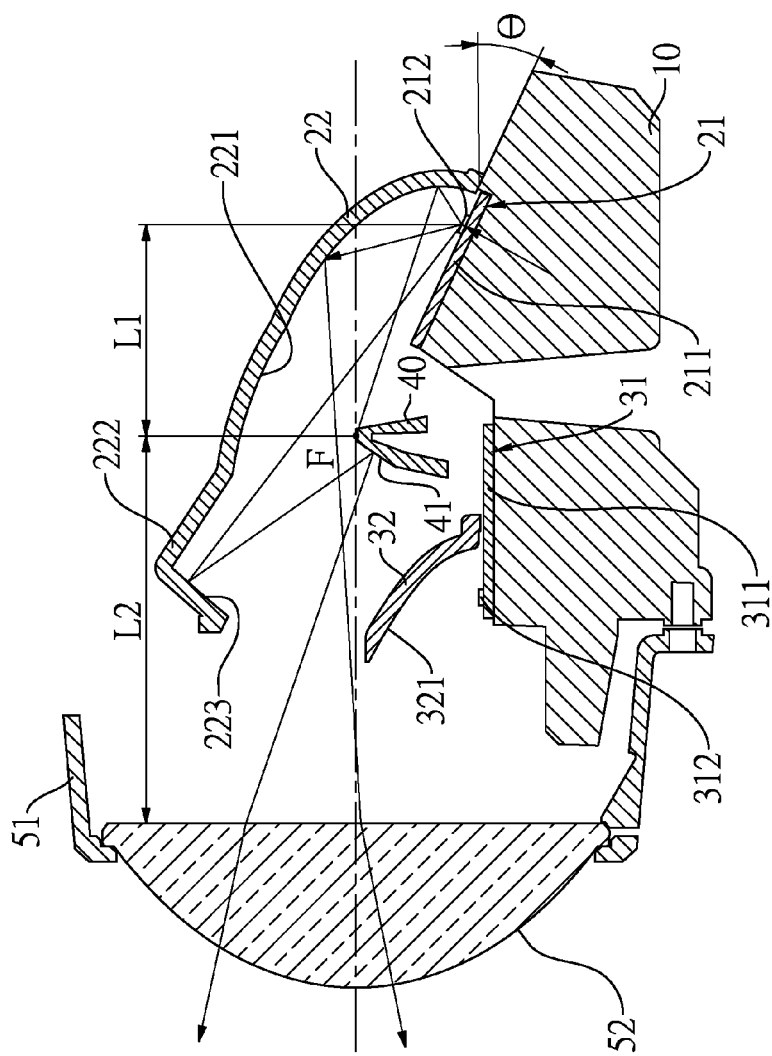
FIG. 8 is a schematic diagram of courses of light beams of the modularized headlight in FIG. 1 in a low beam mode.

In this embodiment, the lens 52 is a convex lens. Precisely, the lens 52 is a biconvex lens or a plano-convex lens. In this preferred embodiment the lens 52 is a plano-convex lens, but it is not limited thereto. In a center of the lens 52 is an optical axis as shown in FIG. 8. The first LEDs 212 and the second LED 312 are mounted under the optical axis, and the top portion of the shading component 40 is on a focus F of the lens 52.

Then refer to FIGS. 5 and 8. A first length L1 is a length from the first LEDs 212 to the focus F of the lens 52. A second length L2 is a length from the focus F of the lens 52 to the lens 52. The second length L2 is larger than the first length L1. When the modularized headlight of the present invention is switched to a low beam mode, the vehicle transmits a power controlling signal to the first illuminating module 21 through the first cable 213, so that the first LEDs 212 emit light beams. Because the first length L1 is shorter than the second length L2, the light beams generated by the first LEDs 212 are converged significantly by the first reflecting surface 221, and then are reflected outward to the lens 52 through the shading component 40, and thus the low beam mode is provided. Besides, because the first length L1 is shorter than the second length L2, the modularized headlight of the present invention has enough space for disposing the heat sink component 11 and thereby the heat dissipation capability is improved.

Because the light beams are transposed right and left by the lens 52, when the light beams are reflected by the first reflecting surface 221 and through the shading component 40, with the shade portion 42 and the slope 421, courses of the light beams are changed and pass through the lens 52, and thereby a cut-off line is formed so that the light beams can comply with regulations.

Furthermore, because part of the light beams generated by the first LEDs 212 are emitted upward and forward, the light beams can be reflected by the first reflective surface 223 of the reflecting portion 222 and toward the second reflective surface 41 of the shading component 40, and thus the light beams are transmitted outward and pass through the lens 52, which causes the modularized headlight of the present invention to partially emit light upward.

Figure 9:
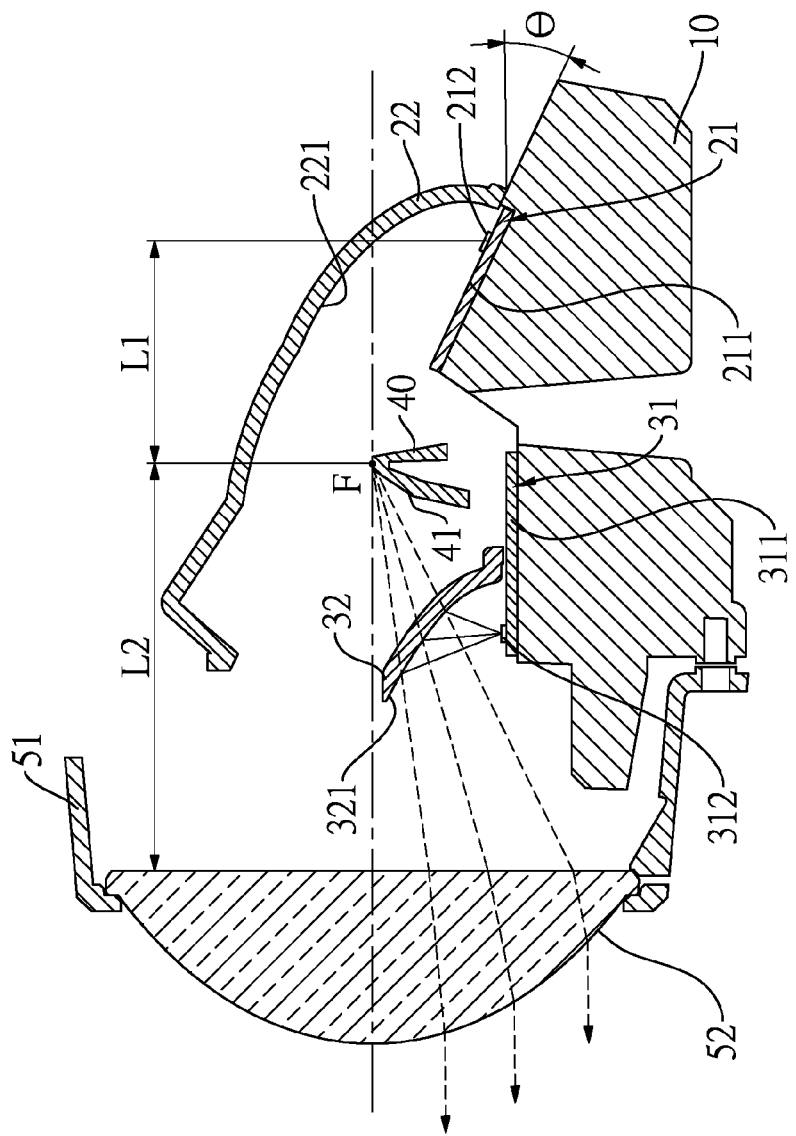
FIG. 9 is a schematic diagram of courses of light beams of the modularized headlight in FIG. 1 in a high beam mode.
Figure 10:
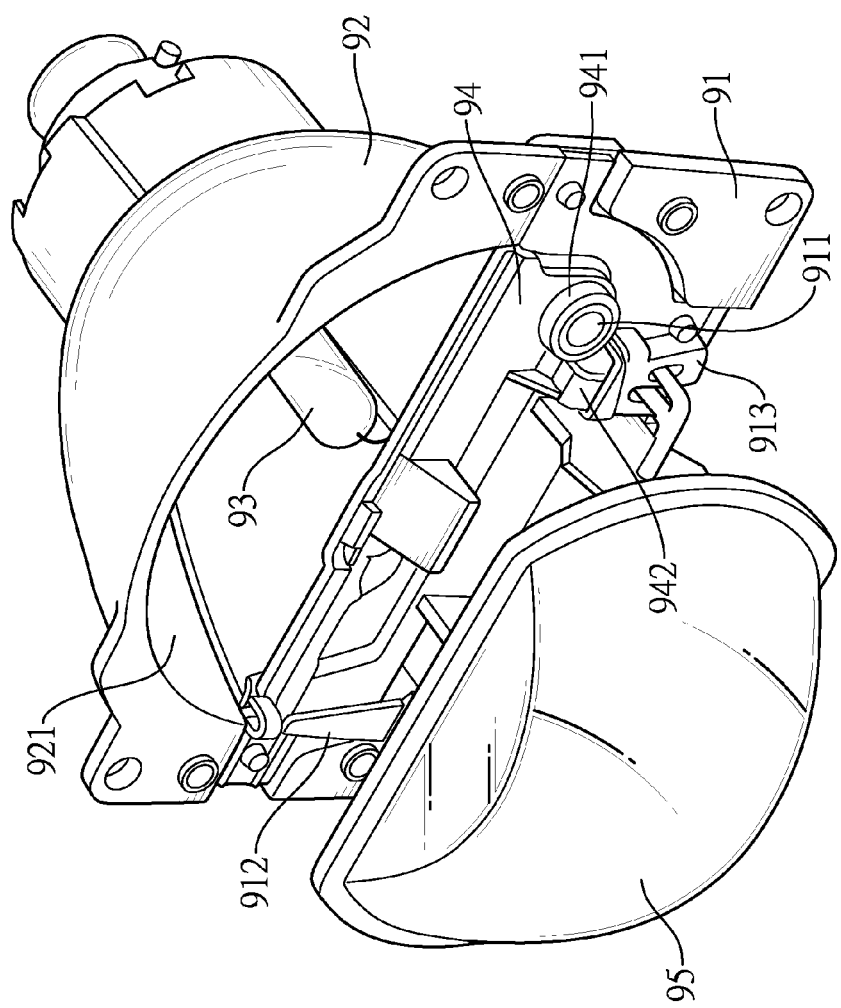
FIG. 10 is a perspective view of a conventional headlight in accordance with prior art.
Figure 11:
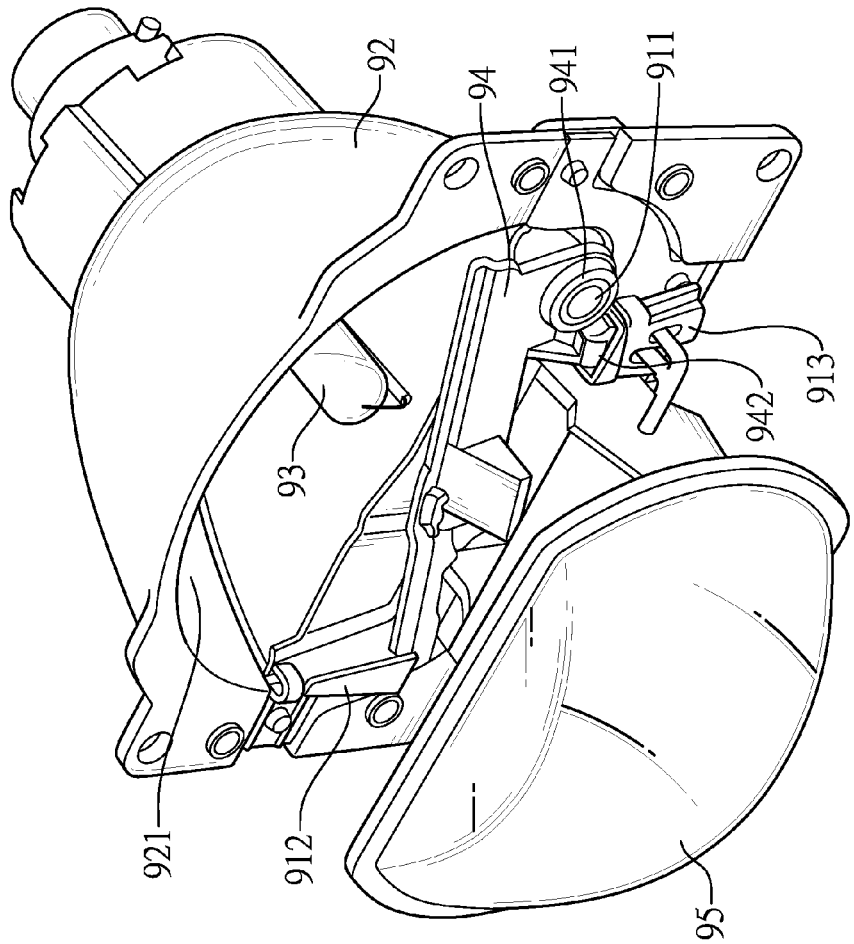
FIG. 11 is an operational view of the conventional headlight in FIG. 10.

When the modularized headlight of the present invention is switched to a high beam mode, the vehicle transmits another power controlling signal to the second illuminating module 31 through the second cable 313, so that the second LED 312 emits light beams. Then please refer to FIG. 9, which shows courses of the light beams that are emitted by the second LED 312 and reflected by the second reflecting surface 321 of the second reflector 32.

With the second LED 312 is located within the range of the second length L2, the light beams generated by the second LED 312 may pass through a point after the focus F because of the imaging rules, and then are reflected by the second reflecting surface 321 and are transmitted outward from the lens 52, and thereby a high beam mode is provided.

With the aforesaid structure, the first illuminating module 21, the first reflector 22 and the shading component 40 become a low beam assembly of the modularized headlight of the present invention, and the second illuminating module 31 and the second reflector 32 become a high beam assembly of the modularized headlight of the present invention. The modularized headlight of the present invention can switch between the low beam mode and the high beam mode without any mechanical mechanism, so that a rate of wearing out by a switch is declined and thereby a durability of the modularized headlight of the present invention is improved.

In addition, with the first length L1 shorter than the second length L2 and the second illuminating module 31 mounted on the second stage 102 of the heat sink base 10, space utilization of the modularized headlight of the present invention is optimized. Furthermore, though a volume of the modularized headlight of the present invention is not enlarged, the heat sink base 10 inside the modularized headlight of the present invention still can be enlarged and thus provide a better heat dissipation ability to the first illuminating module 21 and the second illuminating module 31.

Besides, because the heat sink base 10, the heat sink component 11, the fixing frame 12, the first illuminating module 21, the first reflector 22, the second illuminating module 31, the second reflector 32, the shading component 40, and the lens assembly 50 are screwed by screws, the modularized headlight of the present invention can be assembled quickly, so that the modularized headlight of the present invention can be modularized and the components can be changed and suit different using conditions or regulations.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:
1. A modularized headlight comprising:
  a lens assembly comprising:
    an optical axis;
  a heat sink base, a front end of the heat sink base connected to the lens assembly and comprising:

a first stage formed on the front end of the heat sink base; and
a second stage formed on a rear end of the heat sink base;
a first illuminating module mounted on the first stage and under the optical axis;
a first reflector mounted on the first stage and comprising:
a first reflecting surface facing the first illuminating module;
a second illuminating module mounted on the second stage and under the optical axis;
a second reflector mounted on the second stage and comprising:
a second reflecting surface facing the second illuminating module; and
a shading component mounted on the heat sink base at a front side of the first illuminating module.

2. The modularized headlight as claimed in claim 1, wherein:
the heat sink base further comprises:
a fixing frame forming:
a first opening, the front end of the heat sink base extending through and out of the first opening;
a first side; and
a second side opposite the first side of the heat sink base; and
the second stage of the heat sink base comprises:
two first connecting portions formed on the first side and the second side of the heat sink base respectively and connected on a rear surface of the fixing frame.

3. The modularized headlight as claimed in claim 1, wherein the heat sink base further comprises:
a heat sink component mounted on the first stage and forming:
a cavity on a bottom of the heat sink component for accommodating the first illuminating module and the first reflector.

4. The modularized headlight as claimed in claim 2, wherein the heat sink base further comprises:
a heat sink component mounted on the first stage and forming:
a cavity on a bottom of the heat sink component for accommodating the first illuminating module and the first reflector.

5. The modularized headlight as claimed in claim 1, wherein the first illuminating module comprises:
a first substrate mounted on the first stage; and
a plurality of first light emitting diodes (LEDs) mounted on the first substrate, each one of the LEDs comprising:
an emitting surface facing the first reflecting surface.

6. The modularized headlight as claimed in claim 4, wherein the first illuminating module comprises:
a first substrate mounted on the first stage; and
a plurality of first LEDs mounted on the first substrate, each one of the first LEDs comprising:
an emitting surface facing the first reflecting surface.

7. The modularized headlight as claimed in claim 1, wherein the second illuminating module comprises:
a second substrate mounted on the second stage; and
a second LED mounted on the second substrate and comprising:
an emitting surface facing the second reflecting surface.

8. The modularized headlight as claimed in claim 6, wherein the second illuminating module comprises:
a second substrate mounted on the second stage; and
a second LED mounted on the second substrate and comprising:
an emitting surface facing the second reflecting surface.

9. The modularized headlight as claimed in claim 1, wherein:
a front end of the first reflector comprises:
a reflecting portion comprising:
a first reflective surface formed on an inner surface of the reflecting portion; and
the shading component comprises:
a second reflective surface on a front surface of the shading component and corresponding in location to the first reflective surface.

10. The modularized headlight as claimed in claim 8, wherein:
a front end of the first reflector comprises:
a reflecting portion comprising:
a first reflective surface formed on an inner surface of the reflecting portion; and
the shading component comprises:
a second reflective surface on a front surface of the shading component and corresponding in location to the first reflective surface.

11. The modularized headlight as claimed in claim 1, wherein the shading component comprises:
a first side corresponding to the first side of the heat sink base;
a second side opposite the first side of the shading component and corresponding to the second side of the heat sink base; and
a shade portion formed on a top portion and the first side of the shading component and comprising:
a slope facing the second side of the shading component.

12. The modularized headlight as claimed in claim 10, wherein the shading component comprises:
a first side corresponding to the first side of the heat sink base;
a second side opposite the first side of the shading component and corresponding to the second side of the heat sink base; and
a shade portion formed on a top portion and the first side of the shading component and comprising:
a slope facing the second side of the shading component.

13. The modularized headlight as claimed in claim 1, wherein the lens assembly comprises:
a lens frame comprising:
a second opening; and
a plurality of engaging portions formed on an inner surface of the lens frame; and
a lens mounted in the second opening of the lens frame and an edge of the lens engaged on the engaging portions.

14. The modularized headlight as claimed in claim 12, wherein the lens assembly comprises:
a lens frame comprising:
a second opening;
a plurality of engaging portions formed on an inner surface of the lens frame; and
a plurality of second connecting portions connected with a front surface of the fixing frame; and
a lens mounted in the second opening of the lens frame and an edge of the lens engaged on the engaging portions.

15. The modularized headlight as claimed in claim 1, wherein the lens has a focus and a top portion of the shading component is located on the focus.

16. The modularized headlight as claimed in claim 14, wherein the lens has a focus and a top portion of the shading component is located on the focus.

17. The modularized headlight as claimed in claim 1, wherein the heat sink base further comprises:
   a heat sink portion formed on the front end of the heat sink base.

18. The modularized headlight as claimed in claim 16, wherein the heat sink base further comprises:
   a heat sink portion formed on the front end of the heat sink base.

\* \* \* \* \*